United States Patent
Markovic et al.

(10) Patent No.: US 7,047,490 B1
(45) Date of Patent: May 16, 2006

(54) DISPLAYING THE APPEARANCE OF A PRINTED AND ASSEMBLED DOCUMENT

(75) Inventors: Ivan Markovic, San Jose, CA (US); Ivor Durham, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 771 days.

(21) Appl. No.: 08/978,753

(22) Filed: Nov. 26, 1997

(51) Int. Cl.
*G06F 7/00* (2006.01)

(52) U.S. Cl. .................... 715/527; 345/776; 715/526
(58) Field of Classification Search ............... 707/526, 707/527; 345/776
See application file for complete search history.

(56) References Cited

U.S. PATENT DOCUMENTS

| | | | | |
|---|---|---|---|---|
| 4,174,175 A | * | 11/1979 | DiMaria ................... 355/44 |
| 4,558,373 A | * | 12/1985 | Plasencia et al. ........... 358/484 |
| 4,667,248 A | | 5/1987 | Kanno ..................... 358/452 |
| 5,017,963 A | * | 5/1991 | Tuhro ..................... 399/190 |
| 5,150,458 A | * | 9/1992 | Masuzaki et al. ........... 345/435 |
| 5,191,440 A | * | 3/1993 | Levine .................... 358/450 |
| 5,268,717 A | * | 12/1993 | Imaizumi .................. 399/184 |
| 5,377,019 A | | 12/1994 | Okisu et al. .............. 358/464 |
| 5,394,517 A | | 2/1995 | Kalawsky .................. 345/429 |
| 5,410,649 A | | 4/1995 | Gove ...................... 345/505 |
| 5,442,432 A | * | 8/1995 | Tani ...................... 399/410 |
| 5,467,202 A | * | 11/1995 | Washio et al. ............. 358/448 |
| 5,511,148 A | | 4/1996 | Wellner ................... 395/106 |
| 5,515,144 A | * | 5/1996 | Miyasaka et al. ........... 399/1 |
| 5,634,064 A | * | 5/1997 | Warnock et al. ............ 707/513 |
| 5,652,901 A | * | 7/1997 | Slayden et al. ............ 707/527 |
| 5,696,605 A | * | 12/1997 | Miller et al. ............. 358/468 |
| 5,752,053 A | * | 5/1998 | Takakura et al. ........... 707/505 |
| 5,774,232 A | * | 6/1998 | Tabata et al. ............. 358/448 |
| 5,822,080 A | * | 10/1998 | Chavez .................... 341/20 |
| 5,864,742 A | * | 1/1999 | Gasper et al. ............. 399/366 |
| 5,903,905 A | * | 5/1999 | Andersen et al. ........... 707/526 |
| 6,012,890 A | * | 1/2000 | Celorio Garrido .......... 270/1.02 |
| 6,014,528 A | * | 1/2000 | Natsume et al. ............ 399/19 |
| 6,026,417 A | * | 2/2000 | Ross et al. ............... 707/517 |

OTHER PUBLICATIONS

E–Muni Electronic Bouind Volumes for the Municipal Bond Market, http://www.emuni.com/boundvol.html, 1/11997, p. 1–2.*

Sreen print of Visio Professional 4.5, (c) 1997, showing Page Setup window.

Sreen print of Visio Professional 4.5, (c) 1997, showing Print Preview window.

Sreen print of WordPerfect for Windows 6.1, (c) 1996, showing Columns window.

* cited by examiner

*Primary Examiner*—Cesar B Paula
(74) *Attorney, Agent, or Firm*—Fish & Richardson P.C.

(57) ABSTRACT

A method of depicting a hard copy document, in which a user generates an electronic document and then selects an instruction for assembling a hard copy document. The visual appearance of the electronic document once printed and assembled in accordance with the instruction is determined in the computer, and this visual appearance is produced as output. For example, the visual appearance of the electronic document may depict a printing media used in the hard copy document, such as the weight, color, texture, or transparency of the printing media, a preexisting image on the printing media, a cover to be used in the hard copy document, a binding to be used in the hard copy document, such as a velo tape, spiral, multi-ring, comb, magazine style, or stapling binding, or a physical modification of a printing media used in the hard copy document, such hole punching, folding or cutting.

60 Claims, 7 Drawing Sheets

DISPLAYING THE APPEARANCE OF A PRINTED AND ASSEMBLED DOCUMENT

BACKGROUND

The present invention relates generally to the creation and display of electronic documents, and more particularly to the creation and display of electronic documents that accurately depict hard copy documents.

Electronic documents are stored on computer-readable media (e.g., computer memory or disks) and typically contain content (e.g., text, graphics and image data) and formatting information (e.g., page size and margins). Electronic documents can be stored, retrieved, displayed, and exchanged by computer users. Electronic documents are created by authors and publishers who may desire that the documents be viewed with a particular appearance. The Acrobat™ family of products from Adobe Systems Incorporated, of San Jose, Calif., enables authors and publishers to create, modify, exchange, and view electronic documents in a platform-independent manner. Acrobat™ makes use of a document description language (DDL) called Portable Document Format™ (PDF) which describes a document in a manner independent of the application software, hardware, and operating system used to create it. A PDF document has one or more pages, each containing any combination of text, graphics, and images in a device and resolution-independent format.

Although electronic documents have advantages, including their ease of transmission, compact storage, and ability to be edited, hard copy documents, such as paper documents, continue to be used. In fact, many electronic documents are used only for the eventual production of hard copy documents. Although current desktop publishing programs provide users with the ability to create and modify the content of electronic documents easily, the final form of assembled hard copy documents, for example, as provided by a document assembler (e.g., a printing or copier shop), will often vary from the intended appearance.

SUMMARY

In one aspect, the invention is directed to a method of depicting a hard copy document. A first electronic document is received in a computer. A user input that selects an instruction for assembling a hard copy document is also received in a computer. A visual appearance of the first electronic document once printed and assembled in accordance with the instruction is determined in the computer, and the determined visual appearance is produced as output.

In another aspect, the invention is also directed to a computer program, tangibly stored on a computer-readable medium, comprising instructions for causing the computer to carry out this method.

Implementations may include the following. A second electronic document may be generated which depicts the first electronic document once printed and assembled in accordance with the instruction, and the second electronic document may be displayed. A second user input may be received that selects a second instruction for assembling the hard copy document, and a modified second electronic document may be generated which depicts the first electronic document once printed and assembled in accordance with the first and second instructions. A copy of the first electronic document may be modified, e.g., by adding a tile depicting a change in the visual appearance resulting from the instruction to a page of the first electronic document, to generate the second electronic document. The tile may be retrieved from a database which associates a plurality of instruction identifiers with a plurality of tiles. The database may include an entry for each instruction identifier, each entry including an instruction name and a first tile associated with a front page of the hard copy document, a second tile associated with an inside right page of the hard copy document, a third tile associated with an inside left page of the hard copy document, and a fourth tile associated with a final page of the hard copy document. Retrieving the tile may include determining whether the page of the first electronic document is a first page, an inside right page, an inside left page, or a final page, and selecting the tile based on this determination. Modifying the copy of the first electronic document may include inserting a page into the first electronic document, and adding a tile depicting a change in the visual appearance resulting from the instruction to the inserted page of the first electronic document, and retrieving the tile may include determining whether the cover sheet is a first page or a final page, and selecting the tile based on this determination. The user input may be received from an electronic file through an interactive user interface. Receiving the user input may include displaying a plurality of instruction identifiers in a document assembly form on a display, and receiving a user input selecting one of the instruction identifiers. The instruction may identify a printing media to be used in the hard copy document, such as the weight, color, texture, or transparency of the printing media, a preexisting image on the printing media, a cover to be used in the hard copy document, a binding to be used in the hard copy document, such as a velo tape, spiral, multi-ring, comb, magazine style, or stapling binding, or a physical modification of a printing media used in the hard copy document, such hole punching, folding or cutting of the printing media.

In another aspect, the invention is directed to a method of displaying a finished form of a hard copy document. An electronic document is received and stored in a computer. A user input that selects an instruction for assembling a hard copy document corresponding to the electronic document is received in the computer. A second electronic document which depicts the visual appearance of the first electronic document once printed and assembled in accordance with the instruction is generated, and the second electronic document is displayed.

In another aspect, the invention is directed to a computer-assisted method of creating a hard copy document. An electronic document and user input that selects an instruction for assembling a hard copy document are received. A visual appearance of the electronic document once printed and assembled in accordance with the instruction is depicted, and the electronic document and the user input are provided to a document assembler.

Implementations may include the following. The document assembler may print the electronic document to create the hard copy document, and assemble the hard copy document in accordance with the instructions corresponding to the user input. A second electronic document may be generated which depicts the visual appearance of the hard copy document assembled in accordance with the instruction.

The advantages of the invention may include the following. The visual appearance of an assembled hard copy document may be accurately depicted by an electronic document. The user can experiment to determine the most aesthetically pleasing visual appearance of the assembled hard copy document, and can avoid the high cost of printing that would otherwise be associated with assembling the hard copy document. In addition, the reliability of the production process is improved because both the user and the document assembler have access to both a written and visual description of the document assembly parameters.

Other advantages will become apparent from the following description, including the drawings and the claims.

DETAILED DESCRIPTION

The present invention provides a method for an author or publisher to create and view an "augmented electronic document", i.e., an electronic document that accurately depicts an assembled hard copy document. In brief, after creating an original electronic document, the author or publisher uses a virtual document assembly program to select the instructions, e.g., the desired binding, stapling, or hole punching, that would be given to a document assembler. As the instructions are selected, the virtual document assembly program adds instructions to the electronic document so that, when it is rendered, indicia of the assembly are seen. Thus, the virtual document assembly program generates an augmented electronic document that depicts the finished form of the document. That is, the augmented electronic document depicts a hard copy document having the same content as the original electronic document, but assembled according to the selected instructions. The augmented electronic document may be provided to a document assembler who will print the original electronic document and assemble it according to the instructions. Since both the author or publisher and the document assembler can view the same augmented electronic document, the final form of the assembled paper document should have the appearance intended by the author or publisher. The augmented electronic document may be stored in a device and resolution-independent format, such as PDF.

Figures 1, 5:
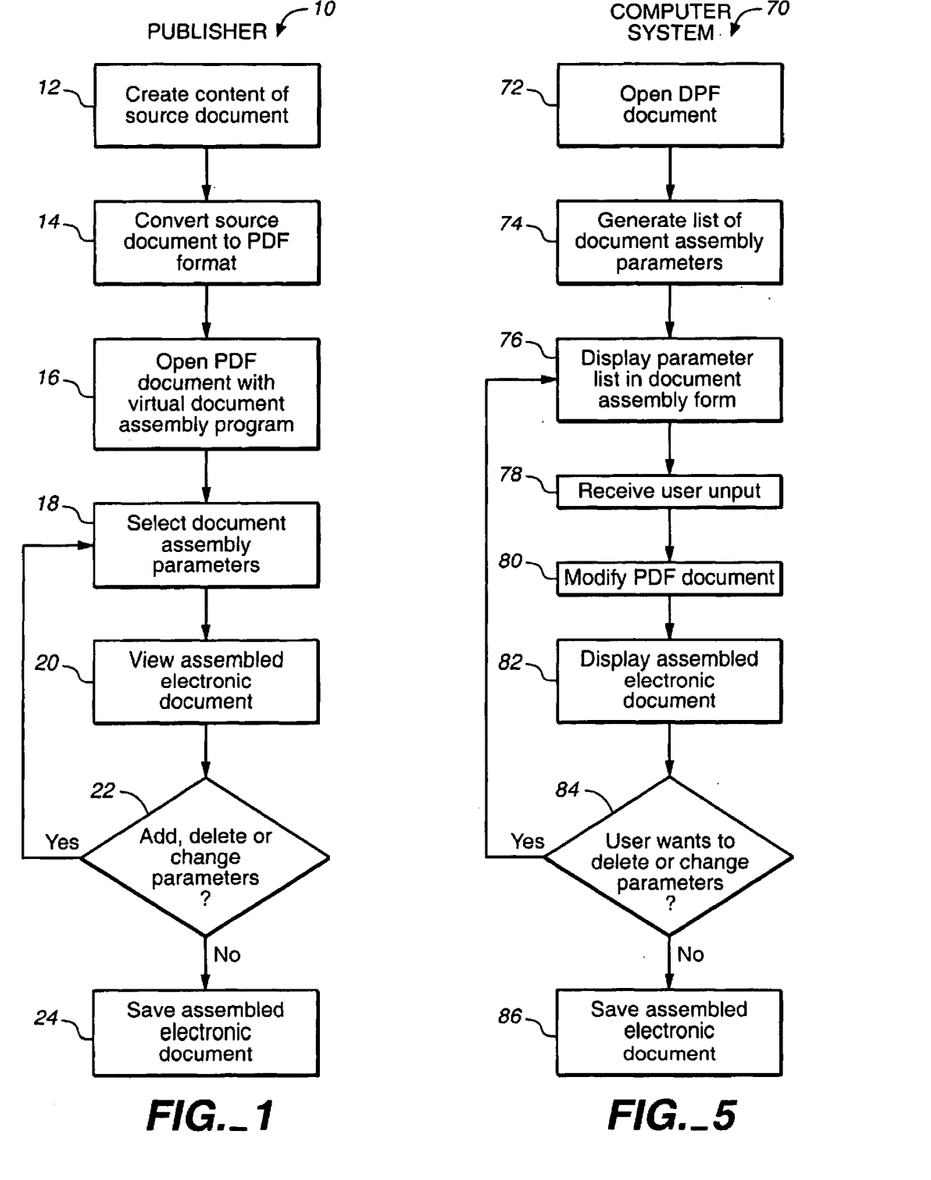
FIG. 1 is a flow diagram illustrating a method performed by a user for creating and viewing an augmented electronic document.
FIG. 5 is a flow diagram illustrating a method performed by a computer system for creating and displaying an augmented electronic document.
Figure 2A:
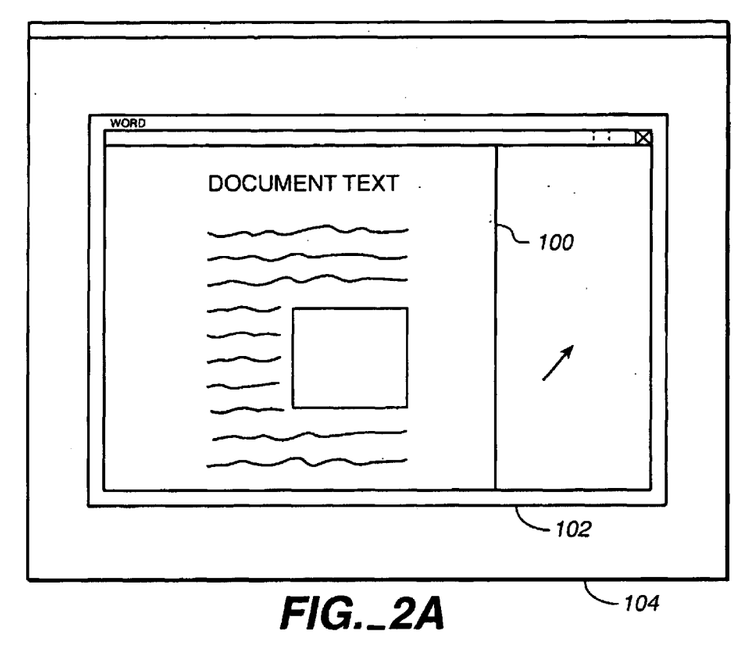
FIG. 2A is an illustration of the step from FIG. 1 of creating an electronic document.

Referring to FIG. 1, a method 10 for creating and viewing an augmented electronic document begins when a user creates a source document (step 12). For example, the user may create a source document using a word processor, a page layout program, or a desktop publishing program. The source document will contain traditional content, such as text, graphics and image data. In addition, the source document may include formatting information that is traditionally associated with the printing of the document, for example, on a laser printer or ink jet printer. For example, the formatting information may include the page size, margins, page numbering and line numbering. Referring to FIG. 2A, a source document 100 is displayed within a window 102 on a computer screen 104.

Figure 2B:
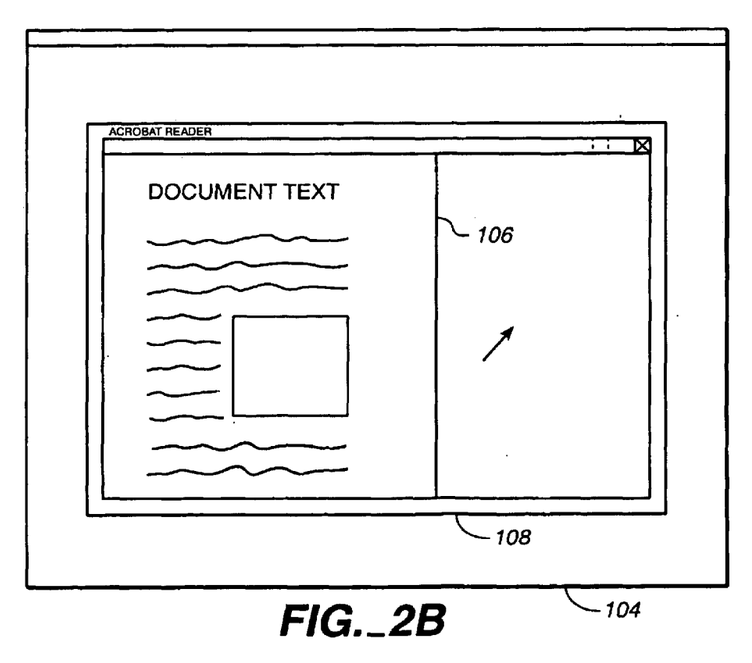
FIG. 2B is an illustration of the step from FIG. 1 of converting an electronic document to PDF format.

Once the source document has been created, the user converts it into a portable document format (PDF) document (step 14 in FIG. 1). For example, the PDF document can be created by using a PDF printer driver to "print" the document as a PDF formatted file to a disk. This process of creating a PDF document from an original document is practiced by the aforementioned Acrobat™ products. The PDF document 106 has the same formatting and appearance as the original source document after it has been printed, but before it has been assembled. Then the user opens the PDF document with a virtual document assembly program (step 16). The virtual document assembly program re-displays the PDF document for viewing by the user. Referring to FIG. 2B, the source document has been converted into a PDF document 106 that is shown within a window 108 on the computer screen 104.

Returning to FIG. 1, the user then uses the virtual document assembly program to select one or more document assembly parameters (step 18). The document assembly parameters correspond to features that the user desires in the assembled hard copy document. For example, the user may select various features associated with aspects of the printing media, such as the weight, color, texture, transparency, shape or orientation of the printing media. In addition, pre-existing images on the printing media, such as watermarks, borders, engravings or designs, may be selected by the user. The user may select features associated with the front and back cover of the augmented electronic document, such as the material (e.g., paper, plastic, etc.,), weight, color, or texture of the front or back cover. The user may insert extra papers or sheets into the document, such as end papers, interleaved blank sheets, and index tabs. The user may also select the binding of the augmented electronic document, such as velo™ binding, tape binding, spiral binding, stapling, multi-ring binder, comb binding, or magazine style binding. For each type of binding, there may be a variety of options, such as the color, pitch and direction of spiral of a spiral binding, or the location of a staple. Finally, the user may select parameters associated with physical modification of the printing media, such as hole punching (including the number and location of drill holes), folding (including the number and direction of folds), and cutting (including the number and direction of cuts).

Figure 2C:
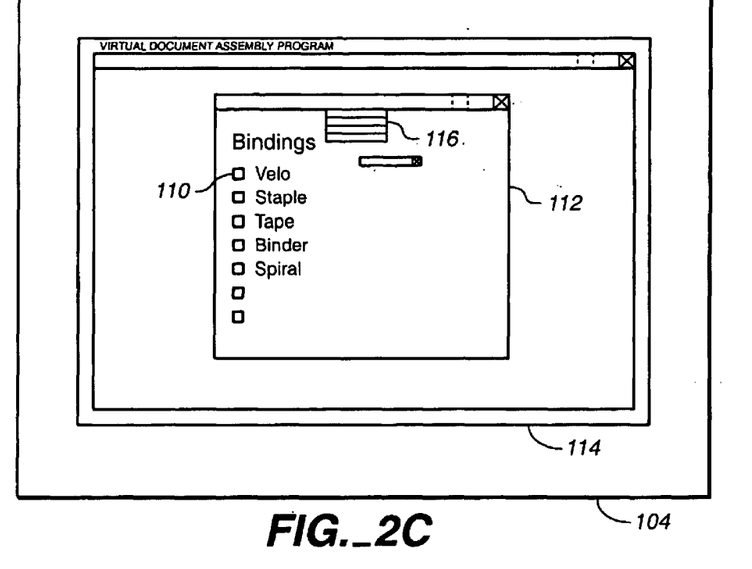
FIG. 2C is an illustration of the step from FIG. 1 of selecting document assembly parameters.

The user may select the document assembly parameters from a document assembly form displayed by the virtual document assembly program. Referring to FIG. 2C, a document assembly form 112 is displayed in a window 114 on the computer screen 104. The user may select document assembly parameters by clicking or typing in controls 110 on the document assembly form 112, such as check boxes, text boxes, combo boxes and radio buttons. In addition, the user may make selections from a pull-down menu 116.

Once the document assembly parameters have been selected, the user views the augmented electronic document (step 20 in FIG. 1). The appearance of the augmented electronic document will be based on the previously selected document assembly parameters, such as the paper color, paper thickness, binding type, front and back cover material. For example, referring to FIG. 2D, the user may view a cover sheet 122 of an augmented electronic document 120.

Figure 2D:
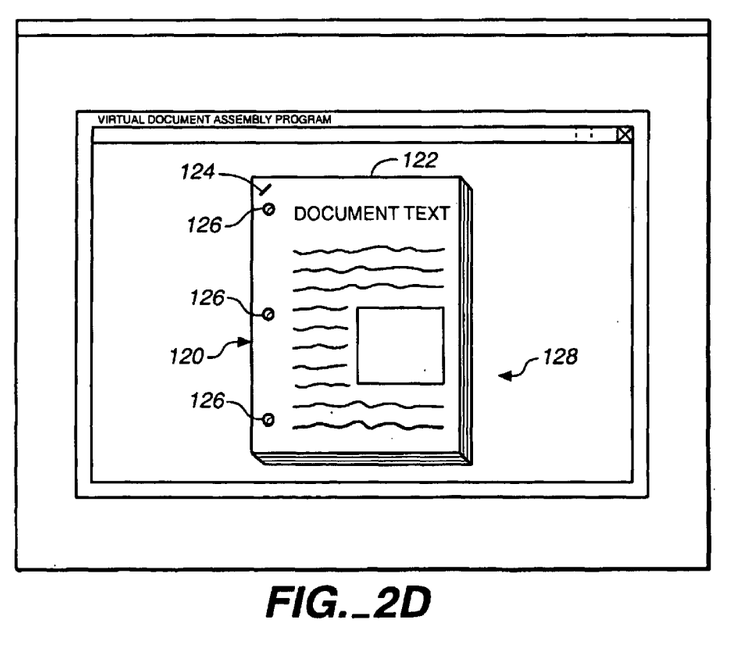
FIGS. 2D–2F are illustrations of the step from FIG. 1 of displaying an augmented electronic document.
Figure 2E:
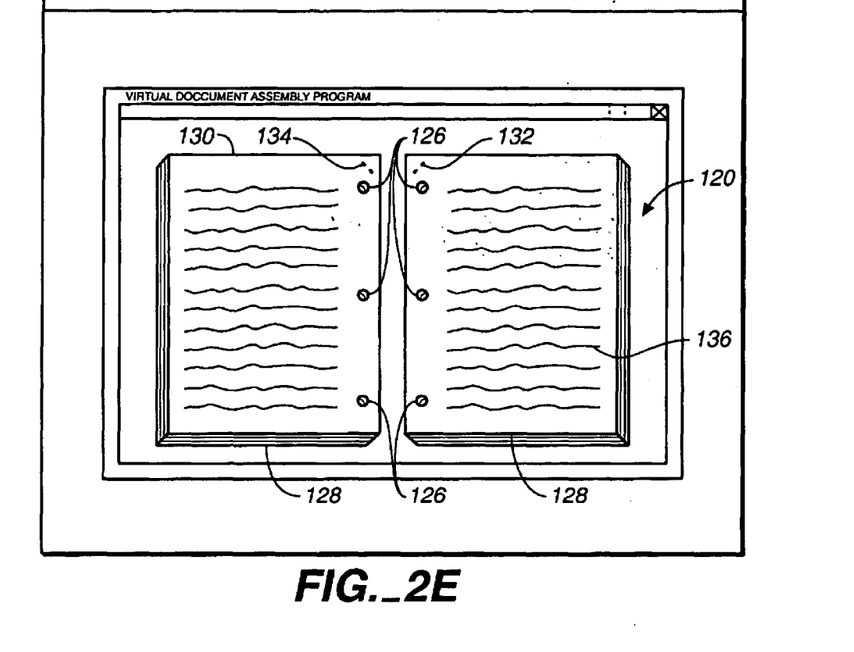

Assuming that the user selects stapling and three-hole punching, a graphic 124 illustrating a staple is positioned where the staple will be place, for example, in an upper left-hand corner of the cover sheet 122, and graphics 126 illustrating punch marks are positioned along the left side of the cover sheet 122. In addition, graphics 128 illustrating the thickness of the assembled document are added to the lower and right-hand sides of the cover sheet 122. The illustrated thickness is based on the number of pages in the PDF document (plus any inserted pages). Referring to FIG. 2E, the user may also view two interior pages 130 and 132 of the augmented electronic document 120. The interior pages 130 and 132 include graphics 126 to illustrate the three-hole punch marks, graphics 134 creating obscured regions where the staple would secure the pages, and text 136. By visually inspecting the appearance of the augmented electronic document 120, the user may be able to note errors or unaesthetic elements that would be present in the assembled hard copy document. For example, the user may note that the punch marks will obscure a portion of the text, and therefore either the margins of the text will need to be changed or the three-hole punching will need to be eliminated. Finally, referring to FIG. 2F, the user may view the back cover 140. The back cover 140 includes graphics 142 illustrating the prongs of the staple, and graphics 126 illustrating punch marks along the left edge of the back cover 140.

Returning to FIG. 1, after viewing the assembled document, the user may add, delete, or change the document assembly parameters (step 22) and then view the modified augmented electronic document (returning to step 20). Thus, the user may experiment and inspect the appearance of the augmented electronic document with different sorts of bindings, paper weights, etc., without the associated printing costs. Finally, when the augmented electronic document has the desired appearance, the user may save the original electronic document with an associated file or addendum containing the document assembly parameters (step 24). In addition, the user may save the augmented electronic document as a separate PDF file. Since the augmented electronic document is a conventional PDF file, it may be displayed with a conventional PDF document viewer.

The user may provide the original electronic document with the associated document assembly parameters to the document assembler who will use the document parameters. The document assembler prints the original electronic document, and extracts the document assembly parameters from the associated file or addendum. The document assembly parameters are then used as instructions for assembling the hard copy document. In addition, the document assembler may use the virtual document assembly program to create a new augmented electronic document. However, since the two augmented electronic documents are created with the same document assembly parameters, they will have the same visual appearance. The document assembler may compare the augmented electronic document to the assembled hard copy document to proofread for mistakes. Since both the user and the document assembler view the same augmented electronic document, the user is assured that the assembled paper document will have the intended visual appearance.

Figure 3:
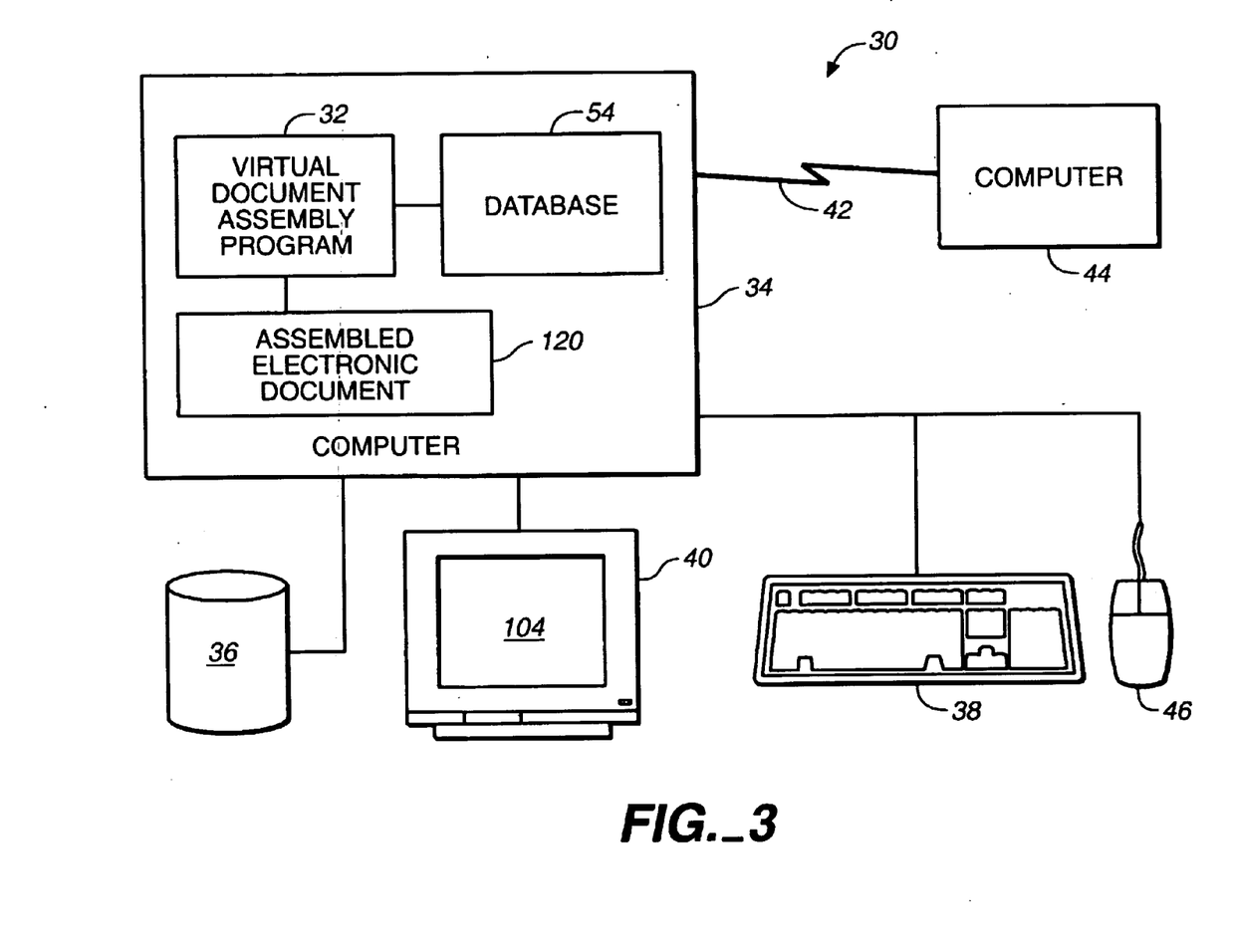
FIG. 3 is a schematic illustration of a computer system that may be used to perform the methods of FIGS. 1 and 5.

Referring to FIG. 3, a computer system 30 for running a virtual document assembly program 32 includes a general purpose programmable digital computer 34 (such as a personal computer or work station), a mass storage device 36 (such as a hard disk drive), a keyboard 38, a pointer device 46 (such as a mouse), and a display 40 with a screen 104 for displaying the augmented electronic document. The computer 34 is of conventional construction, and includes a memory and a processor (not shown). Computer system 30 may also include communications hardware and software (not shown) by which the computer system may be connected to another computer 44 by an intranetwork or internetwork link 42.

Figure 4:
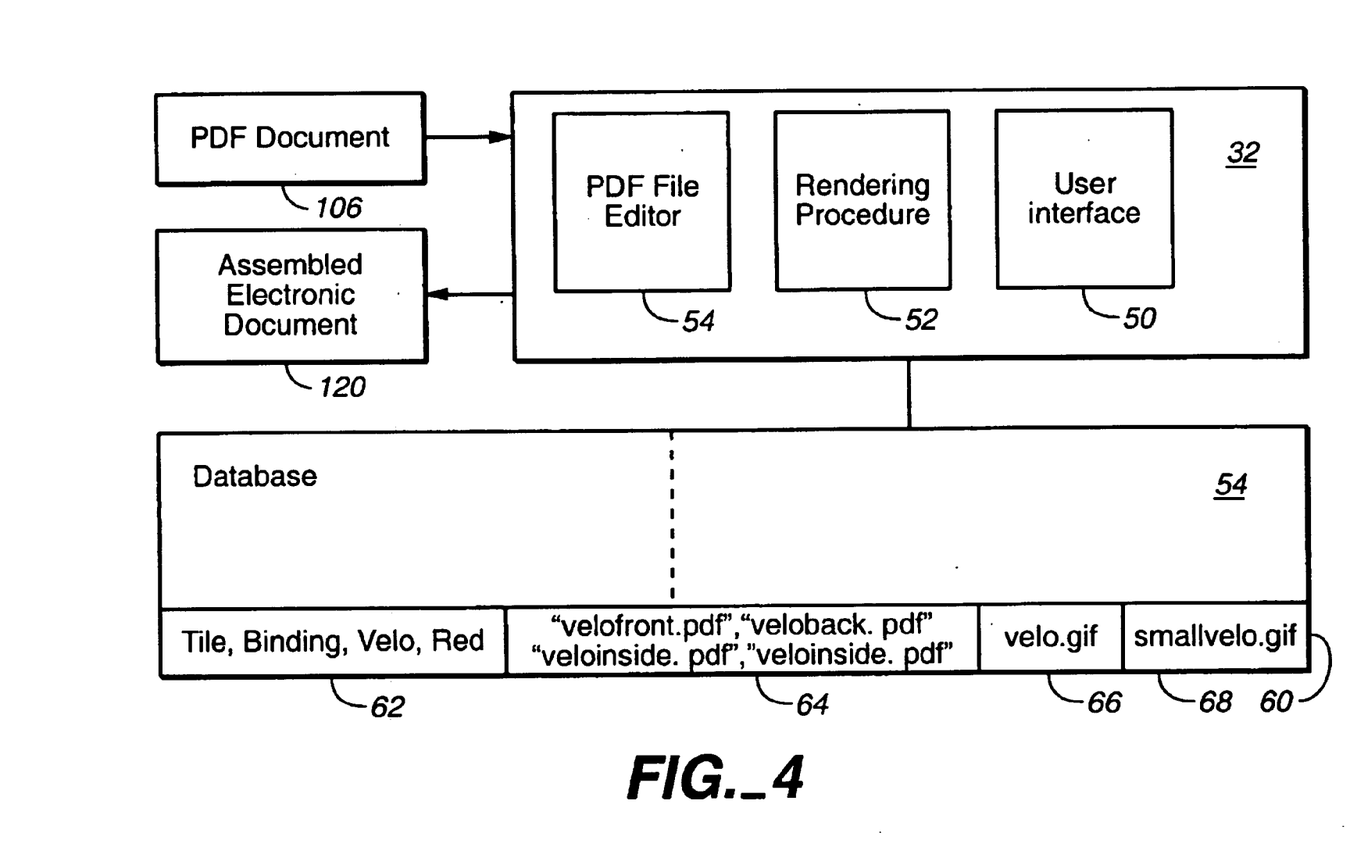
FIG. 4 is a schematic block diagram of a virtual document assembly program that may be used to perform the methods of FIGS. 1 and 5.

The virtual document assembly program 32 creates and displays the augmented electronic document 120. Referring to FIG. 4, the virtual document assembly program 32 includes a user interface 50, a rendering procedure 52, and a PDF file editor 56. The PDF file editor is used to add instructions to the pages of the PDF document to generate the augmented electronic document, whereas the rendering procedure is used to display the augmented electronic document on the computer screen. The program 32 may be centralized on a single computer, or it may be distributed across a computer network. The program 32 may also include or be associated with a database 54 containing permissible document assembly parameters and associated instructions for the rendering procedure 52. The database includes two types of permissible document assembly parameters: those parameters that require a specialized function of the rendering procedure 52 (such as cutting and folding), and those parameters that can be illustrated by overlaying (or "tiling") one or more images on the page (most other parameters). For the parameters that can be illustrated by tiling, each entry 60 in the database 54 includes a parameter name 62, a set of tiling instructions 64, image files 66 to be used in the tiling, and an optional icon 68 for use in displaying a list of the parameters. For the parameters that require a specialized function of the reading program, the entry 60 may include only the parameter name. The parameter names 62 may be organized into classes (e.g., bindings, cover sheets, paper color, etc.) that will be used by the use interface in displaying the document assembly form.

Referring to FIGS. 4 and 5, a method 70 performed by the virtual document assembly program begins by opening the PDF document that was selected by the user (step 72). When the user decides to assemble the electronic document, the program 32 generates a list of document assembly parameters (step 74) and displays the list (step 76) in the document assembly form. In order to generate the list of document assembly parameters, the user interface 50 searches and lists the parameter name 62 for each entry 60 from the database 54. The user interface 50 may use the classes of the parameters names 61 in order to determine how to format the document assembly form, or otherwise improve the visual display. Once the program 32 receives user input selecting various document assembly parameters (step 78), the PDF file editor 56 modifies a copy of the original PDF document to generate the augmented electronic document 120 (step 80). Specifically, the PDF file editor adds the necessary graphic elements to provide the visual appearance of a paper document assembled according to the document assembly parameters. The original PDF document is saved for transmission to the document assembler. For example, the PDF document may be loaded into memory, modified by the PDF file editor, and the modified document in memory may be saved as a separate file.

In brief, returning to FIG. 4, the PDF file editor 56 uses the tiling instructions 64 associated with the selected parameter name 62 from the database 54 to append instructions to each page of PDF document 106. There are four entries in each set of tiling instructions 64; one for the front cover, one for the inside left pages, one for the inside right pages, and one for the back cover. Each tiling instruction includes the size of the tile, the number and spacing of the tiles, and the position of the tiles on the page. Image file 66 contains the tile images. These instructions may be expressed in the conventional PDF format.

Figure 2F:
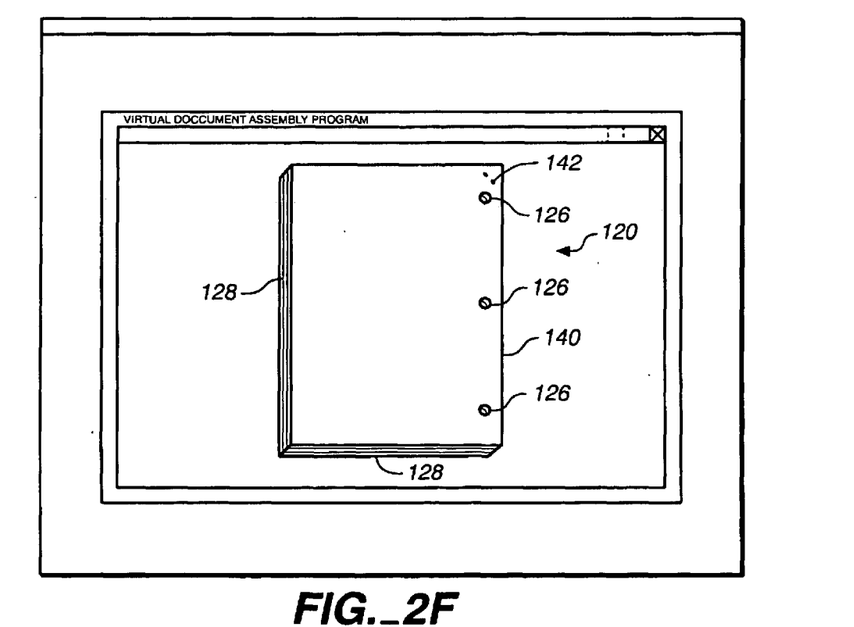

As an example, referring to FIGS. 2D–2F, for a document assembly parameter corresponding to a staple, the tiling instructions 64 would include the following entries: for the first page, overlay a short diagonal segment in the upper left-hand corner of the page; for the inside-left pages, overlay a triangular shaded area in the upper right hand corner of the page; for the inside-left pages, overlay a triangular shaded area in the upper right hand corner of the page; and for the last page, overlay two short diagonal segments in the upper right-hand corner of the page.

Figure 6:
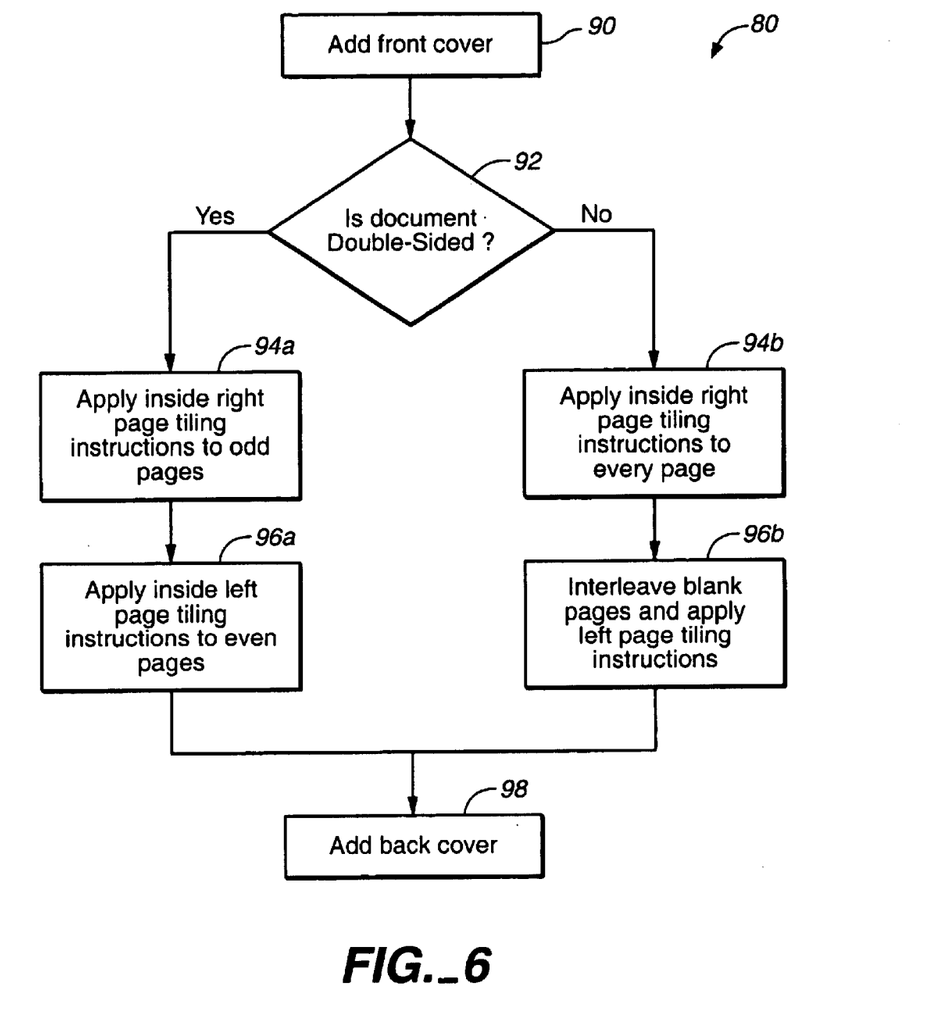
FIG. 6 is a flow diagram illustrating the step from FIG. 5 of modifying an augmented electronic document.

Referring to FIG. 6, modifying the PDF document (step 80 in FIG. 5) will be explained in greater detail. The PDF file editor begins by adding a front cover to the document (step 90). The front cover is formed as a blank page to which the cover sheet parameters and the first-page tiling instructions are applied. If there is no front cover, then the first-page tiling instructions are applied to the first page of the document. Then the PDF file editor determines (e.g., from the source document) whether the document is double-sided (step 92). If the document is double sided, the tiling instructions for the inside right page are applied to each odd page (step 94a), and the tiling instructions for the inside left pages are applied to each even page (step 96a). On the other hand, if the document is to be single-sided, the PDF file editor applies the inside right page tiling instructions to the pages from the PDF document (step 94b). In addition, the PDF file editor interleaves blank pages with the original pages and applies the tiling instructions for the inside left page to the blank pages (step 96b). Once the inside pages have been modified, the PDF file editor may add a back cover page to which the back cover tiling instructions are applied (step 98). Of course, the ordering of the steps discussed above is exemplary. For example, tiles could be applied to the inside pages after the back cover page is added.

In order to determine which tiling instruction takes precedence when modifying the PDF document, the PDF file editor divides the document into five layers: organizational information (e.g., side by side display, folding, double-sided), background (e.g., the color, texture, watermarks of the printed media), printed content (e.g., text, graphics and images from the source document), virtual proof annotations (e.g., cut marks), and finishing options (e.g., drilling, bindings). Tiling effects are given precedence so that the last layer in the above list, i.e., finishing options, is the last applied. This order of precedence may be captured as part of the tiling instructions. The organizational information is appended to the PDF document to be used by the rendering procedure.

The effects that cannot be achieved by tiling (such as cutting and folding) have dedicated procedures in the PDF file editor 54. For example, to generate a cut, the PDF file editor 54 retrieves the location and direction of the cut from the document assembly parameters. For each page that has been cut, the PDF file editor 54 generates two sub-pages corresponding to the portions of the original page on the two sides of the cut. The page of the augmented electronic document is resized, and the sub-pages are pasted onto the resized page so that they are separated by a gap. To generate a folded page, the PDF file editor 54 retrieves the location, direction and angle of fold from the selected document assembly parameter. Then the PDF file editor 54 divides the folded page into sub-pages corresponding to the flaps of the fold. The PDF file editor 54 skews each sub-page to simulate the angle of fold, and then overlays the skewed sub-pages in the proper order to generate a new image. The page of the augmented electronic document is resized, if necessary, and the new image is pasted onto the resized page.

Returning to FIGS. 4 and 5, once the PDF document has been modified, the rendering procedure 52 in the virtual document assembly program 32 renders and displays the augmented electronic document (step 82). Because the augmented electronic document 120 is a conventional PDF file, the techniques of a conventional PDF document viewer, such as Adobe Acrobats, may be used to display the pages from the assembled document.

Once the augmented electronic document is displayed, if the user decides to add, delete or change the document assembly parameters (step 84), the virtual document assembly program 32 redisplays the list of document assembly parameters (returning to step 76). Otherwise, the program 32 saves the electronic document with the selected document assembly parameters, or the augmented electronic document 120 itself, in mass storage (step 86).

What is claimed is:

1. A method of depicting a hard copy document, comprising:

receiving in a computer a first electronic document having a content;

receiving in the computer a user input that selects an instruction for assembling a hard copy document;

determining in the computer indicia of assembly and a visual appearance of the first electronic document as if printed and assembled in accordance with the instruction; and displaying the determined visual appearance with the indicia of assembly overlaid with the content.

2. The method of claim 1, further comprising:

generating a second electronic document which depicts the first electronic document once printed and assembled in accordance with the instruction; and displaying the second electronic document.

3. The method of claim 2, further comprising receiving a second user input that selects a second instruction for assembling the hard copy document, and generating a modified second electronic document which depicts the first electronic document once printed and assembled in accordance with the first and second instructions.

4. The method of claim 2, further comprising:

modifying a copy of the first electronic document to generate the second electronic document.

5. The method of claim 4, further comprising extracting information from the first electronic document.

6. The method of claim 4, wherein modifying the copy of the first electronic document includes adding a tile depicting a change in the visual appearance resulting from the instruction to a page of the first electronic document.

7. The method of claim 6, wherein the instruction identifies a binding option and the tile obscures a portion of the first electronic document where pages of the assembled document would be bound.

8. The method of claim 6, wherein the instruction identifies the position of the tile.

9. The method of claim 6, wherein the instruction identifies the size of the tile.

10. The method of claim 6, wherein the computer receives user input that selects a plurality of instructions.

11. The method of claim 10, wherein the second electronic document includes a plurality of layers to determine the order in which effects associated which the plurality of instructions are applied to the first document.

12. The method of claim 11, wherein the plurality of layers includes an organizational information layer, a background layer, a printed content layer, a virtual proof annotations layer, and a finishing options layer.

13. The method of claim 6, further comprising retrieving the tile from a database which associates a plurality of instruction identifiers with a plurality of tiles.

14. The method of claim 13, wherein the database includes an entry for each instruction identifier, each entry including a instruction name and at least one tile.

15. The method of claim 14, wherein each entry includes a first tile associated with a front page of the hard copy document, a second tile associated with an inside right page of the hard copy document, a third tile associated with an inside left page of the hard copy document, and a fourth tile associated with a final page of the hard copy document.

16. The method of claim 15, wherein retrieving the tile includes determining whether the page of the first electronic document is a first page, an inside right page, an inside left page, or a final page, and selecting the tile based on this determination.

17. The method of claim 15, wherein modifying the copy of the first electronic document includes inserting a page into the first electronic document, and adding a tile depicting a change in the visual appearance resulting from the instruction to the inserted page of the copy of the first electronic document.

18. The method of claim 17, further comprising adding a tile depicting a change in the visual appearance resulting from the instruction to the inserted page of the first electronic document.

19. The method of claim 17, wherein the inserted page is a cover sheet.

20. The method of claim 19, wherein retrieving the tile includes determining whether the cover sheet is a first page or a final page, and selecting the tile based on this determination.

21. The method of claim 1, wherein the user input is received from an electronic file.

22. The method of claim 1, wherein the instruction identifies a printing media to be used in the hard copy document.

23. The method of claim 22, wherein the instruction identifies the weight, color, texture, or transparency of the printing media.

24. The method of claim 22, wherein the instruction identifies a pre-existing image on the printing media.

25. The method of claim 1, wherein the instruction identifies a cover to be used in the hard copy document.

26. The method of claim 1, wherein the instruction identifies a binding to be used in the hard copy document.

27. The method of claim 26, wherein the instruction identifies a velo™, tape, spiral, multi-ring, comb, magazine style, or stapling binding.

28. The method of claim 1, wherein the instruction identifies a physical modification of a printing media used in the hard copy document.

29. The method of claim 28, wherein the instruction identifies hole punching, folding or cutting of the printing media.

30. The method of claim 29, wherein the instruction identifies cutting of the printing media.

31. The method of claim 29, wherein the instruction identifies folding of the printing media.

32. The method of claim 1, wherein the user input is received through an interactive user interface.

33. The method of claim 32, wherein receiving the user input includes displaying a plurality of instruction identifiers in a document assembly form on a display, and receiving a user input selecting one of the instruction identifiers.

34. The method of claim 1, wherein producing the determined visual appearance as output includes displaying the determined visual appearance on a computer monitor.

35. The method of claim 1, wherein determining the visual appearance of the first electronic document includes obscuring a portion of the output in areas corresponding to a portion of the hard copy document that would be obscured when the hard copy document is printed and assembled in accordance with the instruction.

36. The method of claim 35, wherein the instruction identifies a stapling binding, and the obscured portion is located where the staple will be placed in the hard copy document.

37. The method of claim 1, wherein determining the visual appearance of the first electronic document includes providing a visual indication of the thickness of the assembled document.

38. A method of displaying a finished form of a hard copy document, comprising:
    receiving and storing an electronic document in a computer;
    receiving in the computer a user input that selects an instruction for assembling a hard copy document corresponding to the electronic document;
    generating a second electronic document which depicts the visual appearance of the first electronic document once printed and assembled in accordance with the instruction; and
    displaying the second electronic document.

39. A computer-assisted method of creating a hard copy document, comprising:
    receiving an electronic document;
    receiving user input that selects an instruction for assembling a hard copy document;
    depicting a visual appearance of the electronic document as if printed and assembled in accordance with the instruction; and
    providing the electronic document and the user input to a document assembler.

40. The method of claim 39, wherein the document assembler prints the electronic document to create the hard copy document, and assembles the hard copy document after printing in accordance with the instructions corresponding to the user input.

41. The method of claim 39, further comprising creating a second electronic document which depicts the visual appearance of the hard copy document assembled in accordance with the instruction.

42. A computer program, tangibly stored on a computer-readable medium, comprising instructions for causing a computer to:
    receive a first electronic document;
    receive a user input that selects an instruction for assembling a hard copy document;
    determine in the computer the visual appearance of the first electronic document once printed and assembled in accordance with the instruction; and
    produce as output the determined visual appearance.

43. A method of depicting a hard copy document, comprising:
    receiving in a computer an electronic document;
    receiving in the computer a user input that selects an instruction for assembling a hard copy document by selecting pre-printing physical characteristics of a print media material on which the electronic document will be printed;

determining in the computer a visual appearance of the first electronic document as if assembled in accordance with the instruction and then printed; and producing as output the determined visual appearance.

44. A method of depicting a hard copy document, comprising:

receiving in a computer an electronic document;

receiving in the computer a user input that selects an instruction for assembling a hard copy document by physically modifying a print media on which the electronic document will be printed;

determining in the computer a visual appearance of the first electronic document as if printed and then assembled in accordance with the instruction; and producing as output the determined visual appearance.

45. A method of depicting a hard copy document, comprising:

receiving in a computer a first electronic document;

receiving in the computer a user input that selects an instruction for assembling a hard copy document by binding a plurality of pages of print media on which the electronic document will be printed;

determining in the computer a visual appearance of the first electronic document as if printed and then assembled in accordance with the instruction; and producing as output the determined visual appearance.

46. A method of depicting a hard copy document, comprising:

receiving in a computer an electronic document having content and formatting information;

receiving in the computer a user input that selects an instruction for assembling a hard copy document;

determining in the computer a visual appearance of the electronic document once printed with the content arranged according to the formatting information and assembled in accordance with the instruction; and producing as output the determined visual appearance.

47. A method of generating an assembled hard copy document, comprising:

receiving an electronic document having content and formatting information;

receiving a user input that selects an instruction for assembling a hard copy document;

determining a visual appearance of the electronic document once printed with the content arranged according to the formatting information and assembled in accordance with the instruction;

displaying the determined visual appearance;

receiving a user input accepting the determined visual appearance;

printing the electronic document with the content arranged according to the formatting information to generate a hard copy document; and assembling the hard copy document in accordance with the instruction.

48. A computer program, tangibly stored on a computer-readable medium, comprising instructions for causing a computer to:

receive a first electronic document having a content;

receive a user input that selects an instruction for assembling a hard copy document;

determine indicia of assembly and a visual appearance of the first electronic document as if printed and assembled in accordance with the instruction; and display the determined visual appearance with the indicia of assembly overlaid with the content.

49. The program of claim 48, further comprising instructions for causing the computer to:

generate a second electronic document which depicts the first electronic document once printed and assembled in accordance with the instruction; and display the second electronic document.

50. The program of claim 49, further comprising instructions for causing the computer to:

receive a second user input that selects a second instruction for assembling the hard copy document, and generate a modified second electronic document which depicts the first electronic document once printed and assembled in accordance with the first and second instructions.

51. The program of claim 49, further comprising instructions for causing the computer to:

modify a copy of the first electronic document to generate the second electronic document, including instructions for causing the computer to add a tile depicting a change in the visual appearance to a page of the first electronic document resulting from the instruction.

52. The program of claim 51, wherein the computer receives user input that selects a plurality of instructions.

53. The program of claim 52, wherein the second electronic document includes a plurality of layers to determine the order in which effects associated which the plurality of instructions are applied to the first document.

54. The program of claim 53, wherein the plurality of layers includes an organizational information layer, a background layer, a printed content layer, a virtual proof annotations layer, and a finishing options layer.

55. The program of claim 48, wherein the instructions identifies a printing media to be used in the hard copy document.

56. The program of claim 55, wherein the instruction identifies the weight, color, texture, or transparency of the printing media.

57. The program of claim 55, wherein the instruction identifies a pre-existing image on the printing media.

58. The program of claim 48, wherein the instruction identifies a binding to be used in the hard copy document.

59. The program of claim 48, wherein the instruction identifies a physical modification of a printing media used in the hard copy document.

60. The program of claim 48, wherein:

the user input is received through an interactive user interface; and the instructions for causing the computer to receive the user input include instructions for causing the computer to display a plurality of instruction identifiers in a document assembly form on a display, and receive a user input selecting one of the instruction identifiers.

* * * * *

UNITED STATES PATENT AND TRADEMARK OFFICE
CERTIFICATE OF CORRECTION

| | | |
|---|---|---|
| PATENT NO. | : 7,047,490 B1 | Page 1 of 1 |
| APPLICATION NO. | : 08/978753 | |
| DATED | : May 16, 2006 | |
| INVENTOR(S) | : Ivan Markovic et al. | |

It is certified that error appears in the above-identified patent and that said Letters Patent is hereby corrected as shown below:

Column 8, line 65, delete the second occurrence of "which", and replace with --with--.

Column 12, line 34, delete the second occurrence of "which", and replace with --with--.

Signed and Sealed this
Ninth Day of October, 2012

David J. Kappos
*Director of the United States Patent and Trademark Office*